May 5, 1953 W. R. BURK ET AL 2,637,407
AUTOMOBILE THEFT PREVENTION DEVICE
Filed Jan. 25, 1951

INVENTOR
William Russell Burk
Harold Leroy Burk
BY David E. Varner
ATTORNEY

Patented May 5, 1953

2,637,407

UNITED STATES PATENT OFFICE 2,637,407

AUTOMOBILE THEFT PREVENTION DEVICE

William Russell Burk and Harold Leroy Burk, Canton, Mo.

Application January 25, 1951, Serial No. 207,755

4 Claims. (Cl. 180—82)

This invention relates to a device for preventing the theft of an automobile, and more particularly to a key-controlled electromagnetic valve for shutting off the flow of fuel to the engine.

Substantially all present day automobiles are provided with two theft-preventive or unauthorized-use-preventive locks. One is the key-controlled door lock that prevents unauthorized entry into the car and the other is the conventional key-controlled ignition switch that prevents unauthorized operation of the engine. Yet even with these two locks the automobile remains vulnerable to the common thief. Day after day cars are stolen by breaking the window glass or otherwise forcibly entering the vehicle and shorting the ignition switch by a "jumper" connection. Whereupon, the engine can be started, and the car driven away.

Various types of lockable fuel line valves have been developed in an attempt to prevent this type of theft. Such lockable valves have in general, however, possessed disadvantages which rendered them so impractical as to preclude their commercial utilization. Among these disadvantages may be mentioned the lack of truly theft-proof features, undue complication with resulting high cost and/or lack of ease or simplicity of operation, and, if electrically operated, constant battery drain when in locked position.

Accordingly, it is an object of this invention to provide an improved automobile theft-preventer which includes a key-controlled electromagnetic fuel line valve.

It is another object of this invention to provide a device of the type described that is simple and inexpensive in construction, operable with a minimum of thought and effort and extremely effective for its intended purpose.

It is a further object of this invention to provide an automobile theft preventer of the type described that uses no electric current, when in locked condition, except upon an attempted theft.

Figure 1:
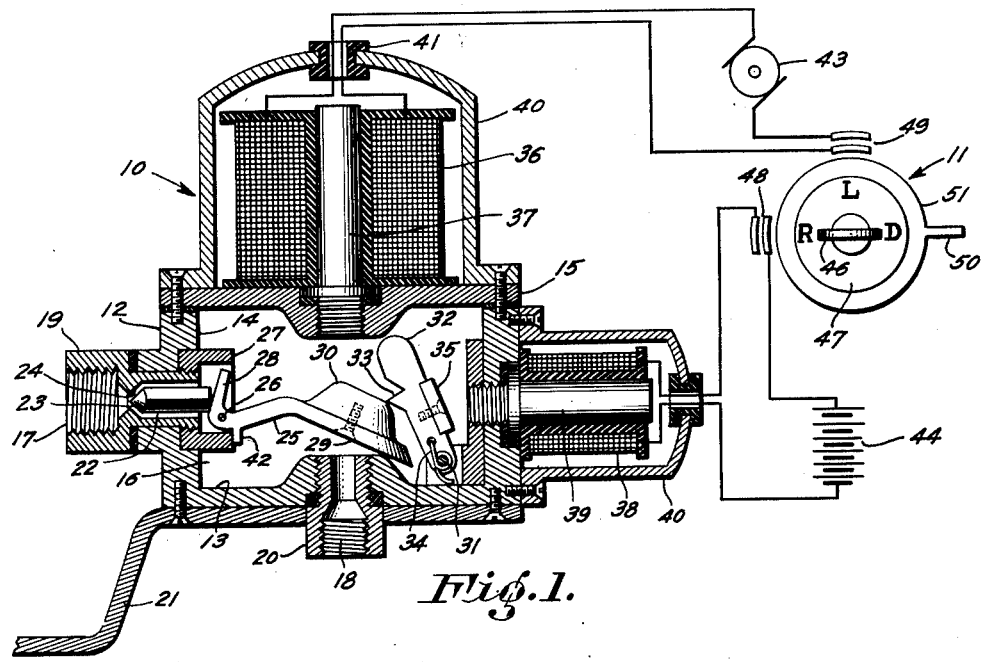
Figure 2:
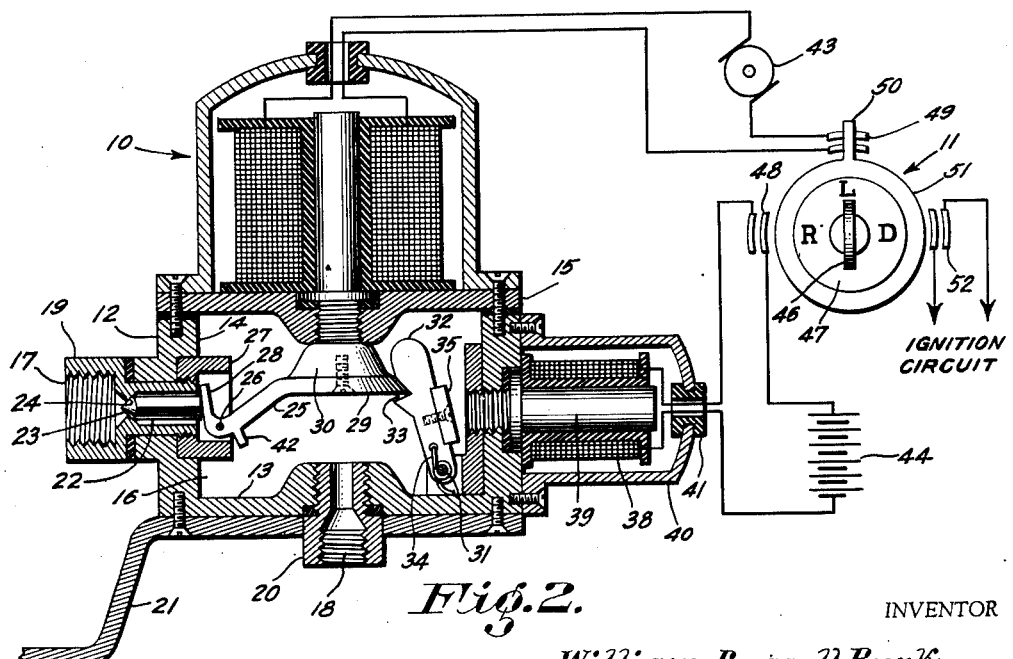

Other objects and advantages will be apparent from the following description and accompanying drawings, in which:

Figure 1 shows an electromagnetic fuel line valve theft-preventing system embodying this invention. The valve is shown in vertical section while the key-controlled switch is illustrated diagrammatically, Figure 2 is a view corresponding to Figure 1 illustrating a modification of the invention.

Referring now to the drawings, a theft preventer embodying this invention consists of two structural units, an electromagnetic valve unit, generally indicated at 10, and a key-controlled switch unit, illustrated diagrammatically at 11.

The valve unit is intended and adapted to be connected into the usual fuel line leading to a carburetor at a location preferably beneath the hood of an automobile and adjacent the engine. The valve unit comprises a casing 12 of non-magnetic material having a bottom 13, upstanding side walls 14, and a detachable cover 15, all forming a closed chamber 16 in which are mounted the movable parts of the valve. An inlet port 17 in a side wall 14 and an outlet port 18 in the bottom 13 are provided by gasketed tubular fittings or bushings 19, 20, respectively that are threaded into thickened wall portions and adapted for fuel line connection. A suitable bracket 21 may be secured to the casing 12 for mounting the valve unit 10 on an automobile.

Slidably mounted within the inlet fitting 19 is a triangular valve element 22 having a tapered head 23 that seats, in an outward direction, against a valve seat 24 formed in the fitting. The valve element 22 normally is held off its seat 24 by flow of fuel through the inlet fitting 19 (or by a spring, not shown) but is seated by operation of a bell crank lever 25 pivotally mounted, as at 26, in a hollow nut member 27 that is threaded onto the inner end of the inlet fitting 19. A short arm 28 of the lever 25 bears against the inner end of the valve element 22 while a long arm 29 of the lever extends into the chamber 16. This long arm 29, if of non-magnetic material, is provided with a member 30 of magnetic material. By the construction illustrated, the lever 25 is biased to valve-releasing position (shown in Figure 1) by gravity, but it will be understood that the lever may also be biased to valve-releasing position by a spring (not shown). Pivotally mounted, as at 31, within the chamber 16 and adjacent the bottom 13 thereof is a latch 32 having a notch 33 for interfitting locking engagement with the suitably shaped outer end of the long lever arm 29 to retain the lever in valve-closing position, as shown in Figure 2. This latch 32 is biased, as by a spring 34, against the outer end of the lever arm 29 for automatic locking engagement therewith when the lever is in valve-closing position. If of non-magnetic material, the latch 32 is also provided with a member 35 of magnetic material.

Mounted on the cover 15 exteriorly of the chamber 16 is an electromagnet 36 having a magnetic type core 37 that is gasketed and threaded into a thickened portion of the cover and projects into operating proximity with the lever arm 29 and the member 30 thereon. A similar electromagnet 38 is likewise mounted on the side of the casing adjacent the latch 32 and has its core 39 projecting into operating proximity therewith. Suitable dust caps 40 for the electromagnets, having rubber grommets 41 for the lead-in wires, are detachably secured to the casing 12. If necessary, a suitable stop element or pin 42 may be provided on the lever 25 for engagement with the nut 27 to limit the extent of valve-opening movement of the lever and thereby maintain the arm 29 within attractive range of the electromagnet 36, as shown in Figure 1.

From the structure described thus far it will be evident that energization of the electromagnet 36 will attract the lever arm 29 and move the lever into valve-closing position, thereby arresting flow of fuel to the engine. The lever 25 is retained in this position, upon deenergization of the magnet 36, by the automatic engagement of the latch 32 with the arm 29. Hence, flow of fuel to the engine can be resumed only by energization of the electromagnet 38 to attract the latch 32 and move it out of engagement with the arm 29 to thereby release the lever 25.

The source of electrical energy for the locking electromagnet 36 is the engine-driven electrical generator 43 with which every modern car is equipped. By connecting this source of energy to the locking electromagnet 36, during periods of disuse of the automobile, a condition is set up whereby no current flows and the valve 22 is not closed unless an unauthorized attempt is made to start the engine. In this event the resulting operation of the generator 43 closes the fuel valve 22 which is automatically latched shut, so that as soon as the small quantity of gasoline normally present in a carburetor is consumed the engine will stop. In order to open the fuel valve 22 the electromagnet 38 must be energized. For this purpose the conventional storage battery 44, present in all automobiles, is used. By controlling the generator-electromagnet and battery-electromagnet electrical circuits with a suitable lockable switch the automobile can be made substantially theft-proof.

A suitable lockable switch 11 for use with this invention is shown in the drawings only diagrammatically. This switch 11 preferably is of the rotary type that is operated by a single key 46, the latter being insertable and removable in only one angular position of the switch. Most conventional ignition switches are of this type, i. e. having a key-controlled tumbler and cylinder type of operating mechanism. Hence, no detailed description of a suitable lockable switch is deemed necessary and the following description is illustrative only. The switch 11 has three successive angular positions which may be termed release, locked, and driving positions, and indicated respectively by the letters R, L, and D on the switch plate 47. Preferably the operating key 46 can be removed from the lock only in the locked position L. The release and locked positions of the switch are each provided with a set of electrical contacts 48 and 49, respectively, which are closed by a contactor 50 mounted on a rotary portion 51 of the switch when the latter is in the corresponding position. The release position contacts 48 are connected into a circuit which includes the battery 44 and the releasing electromagnet 38, while the locked position contacts 49 are connected into a circuit which includes the generator 43 and the locking electromagnet 36. In order to secure additional theft-proof features the lockable switch 11 preferably is mounted on the firewall (not shown) beneath the hood of an automobile with the key-mechanism projecting through the firewall for ready accessibility from the driver's seat, yet disposed in a concealed position beneath the dashboard of the car. In this location all of the electrical connections would be located beneath the hood, which in most modern cars is locked shut. It will be realized, however, that the switch 11 may be mounted on the dashboard similarly to a conventional ignition switch.

Operation of the fuel line lock is evident from the above, but a brief description will serve to clarify operating details. Assuming the car is in locked condition with the switch 11 in the corresponding position L and no attempt has been made to start the engine, the operator, in order to start the car, merely inserts the key 46 in the switch and turns the latter to driving position D, thereby opening the generator circuit. Hence, the condition for potential closing of the fuel valve 22 is removed and the automobile may be started conventionally after turning on a conventional separate ignition switch (not shown). In the event, however, that the engine was started while the switch 11 was in locked position, as by an attempted theft using an ignition "jumper" connection, the fuel valve 22 would be latched shut (as shown in Figure 2), and it would be necessary to turn the switch to release position R prior to turning it to driving position D in order to unlatch and open the fuel valve.

Upon some occasions it would be advantageous to consume all of the fuel normally present in the carburetor before closing the fuel valve, in order to prevent a thief from starting the engine and driving the car even the short distance possible on such a small quantity of fuel. To this end, after the car has been parked and before the engine has been shut off, the switch 11 may be turned from driving to locked position, thus closing the fuel valve 22, and the operation of the engine may be continued until the carburetor fuel has been exhausted. Thereafter, all efforts to start the engine will be to no avail until the switch 11 has been turned to release position R and back to driving position D.

In some instances in order to eliminate the need for two separate keys in order to operate the engine, the conventional ignition switch may be made a part of the fuel valve switch 11, and both the fuel valve and the ignition circuit controlled by a single key. In this modification, which is shown in Figure 2, the driving position D of the switch also is provided with a set of electrical contacts 52 which are closed by the contactor 50 when the switch is in the corresponding position. These contacts 52 are connected into the conventional ignition circuit, as indicated diagrammatically, so that the engine may be started when the switch 11 is in driving position D, without the necessity of closing a separate ignition switch. The operation of such a combined switch is the same as described above, save that in the carburetor fuel-exhausting operation, the switch 11 must be turned from driving to locked and back to driving position in order to operate the engine for exhausting the fuel. Of course, when the switch 11 is turned from driving to locked position the ignition will be turned off, but the engine will "coast" sufficiently to generate enough current to close the fuel valve 22 by the electromagnet 36.

Although a specific embodiment of this invention has been shown and described, it will be realized that such embodiment is only illustrative of the invention and that various changes and modifications will be apparent to one skilled in the art. Therefore this invention encompasses all modifications which come within the spirit and scope of the following claims.

We claim:

1. In a motor vehicle propelled by an internal combustion engine having a fuel line, a theft preventer comprising: an electromagnetic valve controlling the fuel line and biased to open position; a latch for retaining said valve in closed position; electromagnetic means for releasing said latch; a key-controlled rotary switch having two pairs of contacts, each pair being adapted to be closed separately by two different angular positions of said switch; an electric storage battery; a battery circuit including said electromagnetic means and one of said pairs of contacts; an engine-driven electric generator; and a generator circuit including said electromagnetic valve and the other of said pairs of contacts.

2. The structure defined by claim 1 including an electric ignition circuit for the engine and a third pair of switch contacts adapted to be closed by a third position of the switch and connected into said ignition circuit to control the same.

3. In a motor vehicle propelled by an internal combustion engine having a fuel line, a theft preventer comprising: an electromagnetic valve controlling the fuel line and biased to open position; a latch for retaining said valve in closed position; electromagnetic means for releasing said latch; a key-controlled rotary switch having a first and second pair of contacts adapted to be closed, respectively, by a first and second successive angular position of said switch, said switch also having a third successive angular position in which both said pairs of contacts are open; an electric storage battery; a battery circuit including said electromagnetic means and said first pair of contacts; an engine-driven electric generator; and a generator circuit including said electromagnetic valve and said second pair of contacts.

4. The structure defined by claim 3 including an electric ignition circuit for the engine and a third pair of switch contacts adapted to be closed by the third position of the switch and connected into said ignition circuit to control the same.

WILLIAM RUSSELL BURK.
HAROLD LEROY BURK.

References Cited in the file of this patent

UNITED STATES PATENTS

| Number | Name | Date |
|---|---|---|
| 382,165 | Johnson | May 1, 1888 |
| 560,763 | Stout | May 26, 1896 |
| 1,025,047 | Benton | Apr. 30, 1912 |
| 1,108,470 | Parker | Aug. 25, 1914 |
| 1,501,303 | Berry | July 15, 1924 |
| 1,940,380 | Ulloa | Dec. 19, 1933 |
| 2,217,141 | Sprenkle | Oct. 8, 1940 |